(12) United States Patent
Chakareski et al.

(10) Patent No.: US 7,948,886 B2
(45) Date of Patent: *May 24, 2011

(54) SYSTEM AND METHOD FOR THE CONTROL OF THE TRANSMISSION RATE IN PACKET-BASED DIGITAL COMMUNICATIONS

(75) Inventors: Jacob Chakareski, Hackensack, NJ (US); Roi Sasson, New York, NY (US); Alexandros Eleftheriadis, Tenafly, NJ (US)

(73) Assignee: Vidyo, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,845

(22) Filed: Mar. 2, 2010

(65) Prior Publication Data

US 2010/0215053 A1 Aug. 26, 2010

Related U.S. Application Data

(63) Continuation of application No. 11/933,865, filed on Nov. 1, 2007, now Pat. No. 7,701,851, which is a continuation-in-part of application No. PCT/US2006/028365, filed on Jul. 21, 2006, said application No. 11/933,865 is a continuation-in-part of application No. PCT/US2006/028366, filed on Jul. 21, 2006, and a continuation-in-part of application No. PCT/US2006/061815, filed on Dec. 8, 2006, and a continuation-in-part of application No. PCT/US2006/062569, filed on Dec. 22, 2006, and a continuation-in-part of application No. PCT/US2007/063335, filed on Mar. 5, 2007.

(60) Provisional application No. 60/701,108, filed on Jul. 20, 2005, provisional application No. 60/701,109, filed on Jul. 20, 2005, provisional application No. 60/748,437, filed on Dec. 8, 2005, provisional application No. 60/753,343, filed on Dec. 22, 2005, provisional application No. 60/778,760, filed on Mar. 3, 2006.

(51) Int. Cl.
*H04B 1/44* (2006.01)
*G06F 11/00* (2006.01)
*H04L 1/00* (2006.01)
*H04L 12/26* (2006.01)

(52) U.S. Cl. ......... 370/231; 370/232; 370/236; 370/282

(58) Field of Classification Search ................. 370/229, 370/230, 232, 235, 236, 282, 428–429
See application file for complete search history.

(56) References Cited

U.S. PATENT DOCUMENTS

| 6,085,252 | A * | 7/2000 | Zhu et al. ............... 709/231 |
| 6,097,697 | A * | 8/2000 | Yao et al. ............... 370/230 |
| 7,295,520 | B2 * | 11/2007 | Lee et al. ............... 370/236 |
| 7,342,880 | B2 * | 3/2008 | Yanagihara et al. ....... 370/232 |
| 7,542,435 | B2 * | 6/2009 | Leon et al. ............... 370/278 |
| 7,593,339 | B2 * | 9/2009 | Shoemake et al. ......... 370/235 |
| 7,817,625 | B2 * | 10/2010 | Jefremov ............... 370/352 |
| 2005/0058065 | A1 * | 3/2005 | Tiller et al. ............ 370/229 |
| 2007/0133405 | A1 * | 6/2007 | Bowra et al. ............ 370/230 |

* cited by examiner

*Primary Examiner* — Warner Wong
(74) *Attorney, Agent, or Firm* — Baker Botts LLP

(57) ABSTRACT

A transmission bit rate control mechanism for a packet-based communication system in which sender transmission bit rates can vary over time is provided. The transmission bit rate mechanism includes a receiver recording mechanism, which receives transmission time information, computes and records statistical parameters of packets received from a sender; and a receiver processing mechanism, which selectively computes a new transmission bit rate using the recorded statistical parameters, and communicates a new transmission bit rate to the sender.

6 Claims, 8 Drawing Sheets

SYSTEM ARCHITECTURE

F I G. 1: SYSTEM ARCHITECTURE

F I G. 2: RECEIVING SYSTEM'S BIT RATE ESTIMATOR

FIG. 3: TIME WINDOW OPERATION AT THE RECEIVER

F I G. 4: EFFECT OF NETWORK ROUTER CONGESTION ON JITTER

FIG. 5: BIT RATE ESTIMATOR

FIG. 6: DECISION LOGIC UNIT: PREPROCESSING OPERATION

FIG. 7: DECISION LOGIC UNIT: JITTER-BASED ESTIMATOR

FIG. 8: DECISION LOGIC UNIT: RATE-BASED ESTIMATOR

SYSTEM AND METHOD FOR THE CONTROL OF THE TRANSMISSION RATE IN PACKET-BASED DIGITAL COMMUNICATIONS

CROSS-REFERENCE TO RELATED APPLICATIONS

This application is a continuation of U.S. application Ser. No. 11/933,865, filed Nov. 1, 2007 now U.S. Pat. No. 7,701,651, which is a continuation in part of International Application Serial No. PCT/US06/028365, filed Jul. 21, 2006, which claims priority from U.S. Provisional Patent Application No. 60/701,108 filed Jul. 20, 2005; a continuation in part of International patent application No. PCT/US06/028366 filed Jul. 21, 2006 which claims priority from U.S. Provisional Patent Application No. 60/701,109 filed Jul. 20, 2005; a continuation in part of International patent application No. PCT/US06/061815 filed Dec. 8, 2006, which claims priority from U.S. Provisional Patent Application No. 60/748,437 filed Dec. 8, 2005; a continuation in part of International patent application No. PCT/US06/062569 filed Dec. 22, 2006, which claims priority from U.S. Provisional Patent Application No. 60/753,343 filed Dec. 22, 2005; and a continuation in part of International patent application No. PCT/US07/63335 filed Mar. 5, 2007 which claims priority from U.S. Provisional Patent Application No. 60/778, 760 filed Mar. 3, 2006. All of the aforementioned applications, which are commonly assigned, are hereby incorporated by reference herein in their entireties.

FIELD OF THE INVENTION

The present invention relates to the control of the transmission rate in packet-based digital communications. In particular, the invention relates to mechanisms for estimating the available network bit rate at a receiver for communicating packets to a transmitter.

BACKGROUND OF THE INVENTION

Transmission rate control is an important part of real-time video and audio communication systems, as it enables dynamic adaptation of the systems to time varying network conditions. Transmission rate control prevents the creation of a backlog of packets at an intermediate router along the network path between the sender and the receiver. In the absence of rate control, a backlog of packets (i.e. a congestion event) is created whenever there is a mismatch between the transmission rate of the sender and the available network bit rate on the path. The congestion events can contribute to excessive delays and potential losses of transmitted packets, thereby significantly degrading the audiovisual quality of a communication session.

Decisions on transmission rate control actions can be made either at the sender, based on receiver feedback, or at the receiver, based on information associated with arriving packets. In the latter case, the decisions are then signaled back to the sender. Among the most notable examples of prior work on sender-driven rate control is the TCP-friendly scheme. (See e.g., "Equation-Based Congestion Control for Unicast Applications," Sally Floyd, Mark Handley, Jitendra Padhye, and Joerg Widmer, August 2000, SIGCOMM 2000). In this scheme, an equation-based technique for congestion control is used to compute the available network bit rate based on running estimates of the round-trip time, of the packet loss, and of the variance of the round-trip time, as experienced on the network path between the sender and the receiver. The sender adjusts its transmission rate dynamically based on the computed available bit rate. In the TCP-friendly scheme, feedback based only on the last received packet within every round-trip time interval is sent to the receiver.

It is advantageous to consider rate control techniques, which differ from the TCP-friendly approach in that: (1) they are performed at the receiver, and (2) they employ a different mechanism to compute the available bit rate estimate. The former distinction is advantageous in scenarios of low-latency communication such as video conferencing, where decision-making at the receiver eliminates excessive feedback from the receiver to the sender. The latter difference can provide improvement in performance over the TCP-friendly scheme, as it may be possible to treat every arriving packet individually before computing a rate control decision. Prior art techniques related to receiver-driven rate control assume a uniform transmission rate and therefore operate on the inter-arrival times of arriving packets at the receiver. This uniform transmission rate assumption is not true in the case of video communications where the sending rate can exhibit significant variations over short periods of time, thereby rendering the analysis employed by such techniques inappropriate in video communication scenarios. Some prior art techniques related to receiver-driven rate control include the concept of monitoring the increase in inter-arrival time relative to the fixed inter packet-probe interval used by the sender. Further, the prior art techniques related to receiver-driven rate control assume time-synchronization between the sender and the receiver, so that the one-way delay can be accurately computed from the time-stamp and the arrival time associated with a packet. (See e.g., M. Jain and C. Dovrolis, "Pathload: a measurement tool for end-to-end available bandwidth," Proc. Passive Active Measurements, Fort Collins, Colo., March 2002; V. Ribeiro, R. Riedi, R. Baraniuk, J. Navratil, and L. Cottrell, "pathChirp: efficient available bandwidth estimation for network paths," Passive and Active Measurement Workshop 2003; and Shawn W. Smith, U.S. Pat. No. 6,996,626, "Continuous bandwidth assessment and feedback for voice-over-internet-protocol (VoIP) comparing packet's voice duration and arrival rate").

Consideration is being given to developing mechanisms for efficient transmission rate control in video communication systems. In particular, attention is being directed toward mechanisms that operate on information associated with arriving packets at the receiver and provide the sender with an estimate of the available bit rate on the network path between the sender and the receiver. The desirable mechanisms do not assume time synchronization between the sender and the receiver to compute the one-way delay from the time-stamp and the arrival time associated with a packet. Further, the desirable mechanisms may combine concepts of monitoring the increase in inter-arrival time relative to the fixed inter packet-probe interval used by the sender with new ways to detect congestion events in the network, for example, based on the variance of the delay jitter. By their design, the desirable mechanisms will overcome many of the shortcomings of existing transmission rate control solutions.

SUMMARY OF THE INVENTION

The present invention provides transmission rate control techniques for point-to-point video and audio communication systems. The techniques are applied at the receiver and aim to infer the available network bit rate from the information associated with the received packets. One technique estimates the available bit rate through the observed packet delays, while a second technique operates directly on the arrival rate values associated with the packets.

In an embodiment of the invention, the receiving system monitors the dynamics of the packet delay jitter and computes an estimate of the available network bit rate based on that. In an alternative embodiment, the receiving system tracks the dynamics of the arrival data rate of incoming packets and computes an estimate of the available bit rate based on the arrival data rate. The sending system can adjust its transmission rate according to the computed estimate, in order to optimize the audio or visual experience at the receiving system.

BRIEF DESCRIPTION OF THE DRAWINGS

Further features, the nature, and various advantages of the invention will be more apparent from the following detailed description of the preferred embodiments and the accompanying drawings in which.

Throughout the Figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

Figure 1:
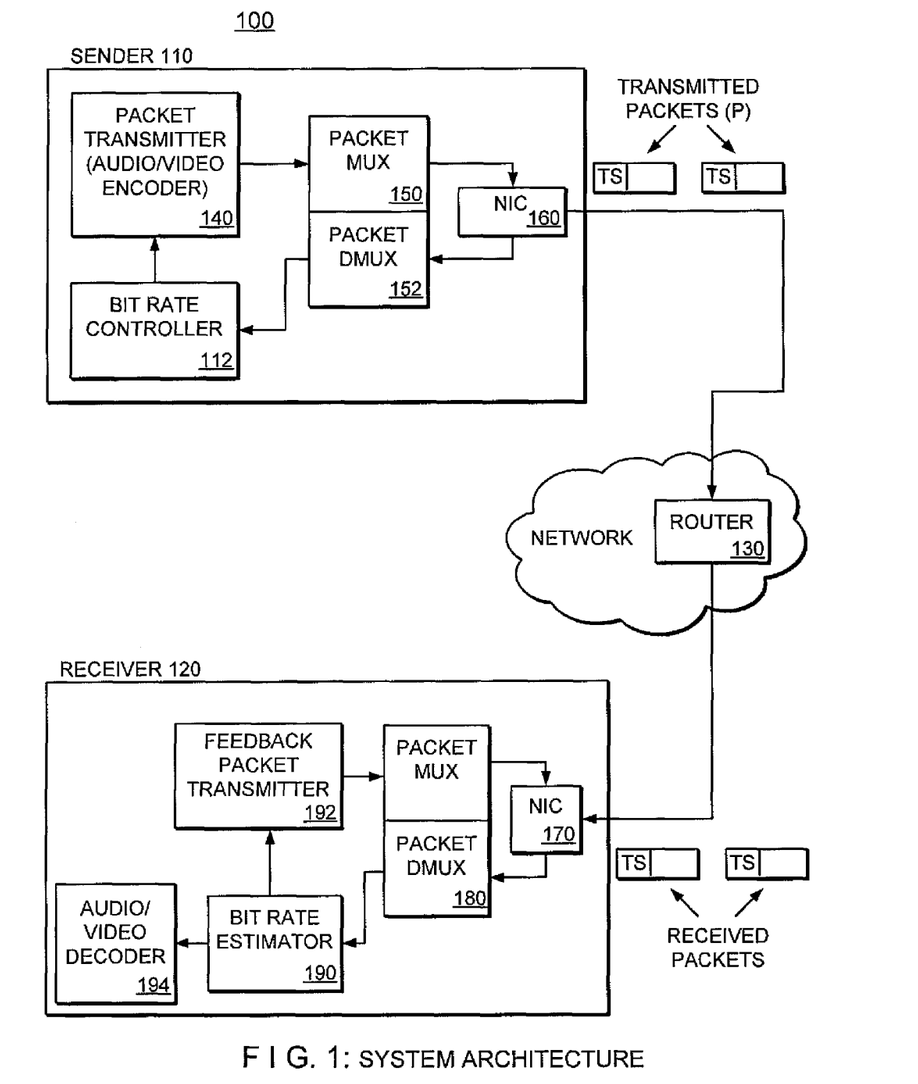
FIG. 1 is a schematic illustration of the overall architecture of a video communication system having transmission rate control, in accordance with the principles of the present invention.

FIG. 1 shows the architecture of an exemplary communication system 100 for illustrating the application of the transmission rate control techniques of the present invention. System 100 includes a Sender 110 and a Receiver 120 linked over a network via a Router 130. At Sender 110, a packet transmitter 140 generates packets containing data and transmits them through the network by multiplexing them at packet multiplexer 150 and submitting them to a Network Interface Controller (NIC) 160. Packet multiplexer 150 may be a standard RTP/UDP/IP stack, or any other suitable packet multiplexing mechanism. NIC 160 may be a 10Base-T Ethernet interface or any other packet-based link layer interface. FIG. 1 shows packet multiplexer 150 and NIC 160 as separate functional blocks, but these may also be implemented as a single unit (e.g., in a hardware-based network acceleration board that handles all layers, from transport down to the link layer). Packet transmitter 140 shown in this exemplary system 100 design is a video and/or audio encoder. It will be understood, however, that system 100 may be used to transmit any form of data, including data that may be acquired (and optionally encoded) in real-time as well as data that may have been acquired (and optionally encoded) in advance.

Sender 110 marks each outgoing packet $P_i$ with a time-stamp $TS_i$, which corresponds to the time instance when the packet was destined for transmission at the sender. The time-stamp $TS_i$, which is generated based on the Sender's clock (not shown in the figure), is included in the outgoing packet's header. When RTP/UDP/IP is used for packet transport, $TS_i$ can be transported in an RTP header extension. It is noted the time-stamp $TS_i$, which is generated based on the Sender's clock, is different than the RTP time-stamp, which corresponds to the data's presentation time stamp and is present in the main RTP header.

With continued reference to FIG. 1, the transmitted packets $P_i$ travel through the network, traversing one or more routers 130, and arrive at Receiver 120. Although a single router is shown within the network, it will be understood that the network may employ any number of intermediate nodes such as routers, bridges, firewalls, protocol converters, etc. Receiver 120 is equipped with an NIC 170, a packet demultiplexer 180, and a Bit Rate Estimator (BRE) 190. Demultiplexed packets corresponding to the data for which bit rate estimation will be effected are provided to BRE 190. The packets are also provided, in this particular example, to Receiver's audio/video decoder 194 for decoding and playback.

As part of the communication session setup process, it is assumed that a maximum bit rate $W_{max}$ is established between Sender 110 and Receiver 120. This is accomplished using session setup signaling, e.g., using SDP offer/answer, or any other suitable session setup protocol. It may also be established by sending probe packets between the Sender 110 and Receiver 120 and measuring the effective throughput as reported by the Receiver 120. The Sender will not exceed the established maximum bit rate $W_{max}$ during the communication session, unless a new value is renegotiated, or otherwise signaled, between the Sender and the Receiver. In a preferred embodiment, $W_{max}$ is also used as the operating transmission bit rate of the Sender, unless otherwise instructed by the Receiver. Alternatively, the initial transmission bit rate can be determined by operating a network "probe", i.e., exchange of a plurality of packets between the Sender and the Receiver.

BRE 190 generates feedback packets that are transmitted from the receiving system (Receiver 120) back to the sending system (Sender 110), so that the latter increases or decreases, as appropriate, its transmission bit rate. The Receiver's Feedback Packet Transmitter 192 sends the feedback packets through the Receiver's MUX 182 and NIC 170 over the network to the Sender's NIC 160 and DMUX 152, from which the feedback packets are delivered to the Sender's Bit Rate Controller 112. The Sender's Bit Rate Controller 112 informs the Sender's Packet Transmitter 140 to modify its transmission bit rate according to the feedback. It is noted that when the Sender's Packet Transmitter 140 is a live audio or video encoder, this may involve modifying the encoding parameters of the stream (e.g., QP values of coded video, the number and types of scalability layers included in the transmitted packets, etc.). Other mechanisms for modifying the transmission bit rate may be used when the content is pre-coded (e.g., Dynamic Rate Shaping for pre-compressed video, where compressed-domain processing is applied in the coded video signal to reduce its bit rate).

Sender 110 may be a Scalable Video Communication Server (SVCS) like that described in International Patent Application PCT/US06/028366, or a Compositing SVCS like that described in International Patent Application PCT/US06/62569. In these cases, the Packet Transmitter 140 of Sender 110 may effect rate control by performing selective multiplexing of different layers, or truncation of FGS layers, if provided by the source encoder that precedes the SVCS or CSVCS in the transmission path. Specific rate control techniques for scalable video coding that are described in International Patent Application PCT/US07/63335 may be used. Furthermore, Receiver 120 also may be an SVCS or a CSVCS. In such cases, receiver operation is the same as the one described herein.

System 100 is described herein with reference to FIG. 1 as operating in a one-way mode (e.g., from Sender to Receiver). However, it will be understood that the one-way operating principles of system 100 can be directly applied to two-way communications by combining sender and receiver systems at each of the communication participants.

As the packets travel through the network, they are subject to time-varying delays. As a result, the time difference between the transmission of packets at the sender and the time difference between the arrivals of the corresponding packets at the receiver will be different.

Figure 2:
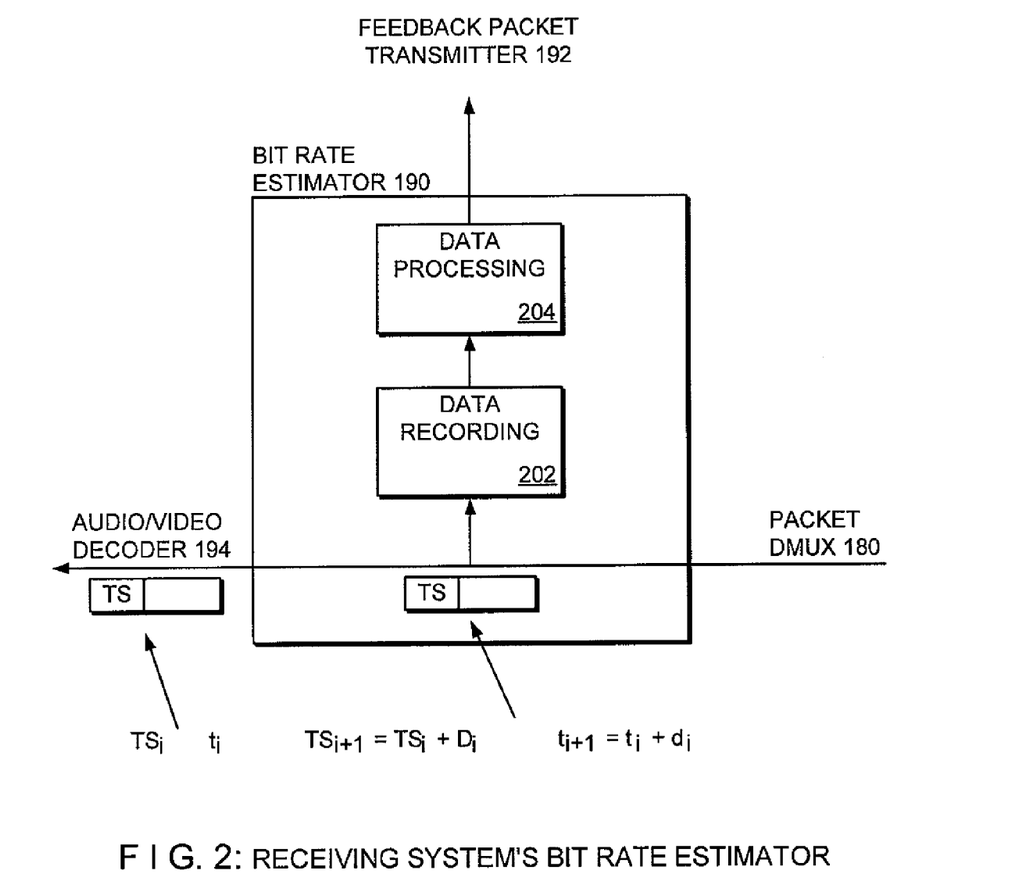
FIG. 2 is a schematic illustration of the architecture of the receiving system's bit rate estimator, in accordance with the principles of the present invention.

FIG. 2 shows the general architecture of BRE 190 in Receiver 120. BRE 190 includes suitable rate estimation and control algorithms. BRE 190 monitors the incoming packets $P_i$, and records a number of parameters in the Data Recording Unit 202. In all embodiments of the invention described herein, Data Recording Unit 202 marks and records the arrival time $t_i$ of each packet $P_i$. It is noted that arrival times $t_i$ are generated based on the Receiver's clock (not shown in the figure). It is further noted that the difference between the time stamp values ($TS_i$) of successive packets $P_i$ and $P_{i+1}$ is, in general, not the same as the difference between the arrival time values ($t_i$) of the same packets. In other words, if $TS_{i+1}=TS_i+D_i$ and $t_{i+1}=t_i+d_i$, then $D_i \neq d_i$. Data Recording unit 202 also records the $TS_i$ value of each packet $P_i$.

Based on the information associated with the arriving packets and collected in the Data Recording unit 202, Data Processing Unit 204 of BRE 190 determines the network-induced effects on the transmitted packets. Specifically, the Data Processing Unit 204 may be configured to determine how the transmission bit rate of Sender 110 compares with the available network bit rate. If Sender 110 is sending packets at a higher rate, then Receiver 120 informs the Sender to reduce the transmission rate of its outgoing packets. Conversely, if Sender 110 is sending packets at a lower rate, Receiver 120 informs the Sender that there is still bit rate available in the network that the Sender can take advantage of The results of the rate comparisons by Data Processing Unit 204 are provided to Feedback Packet Transmitter 192 of Receiver 120 so that an appropriate feedback packet can be transmitted back to the Sender. It is noted that in two-way communication, the feedback data may be combined with one of the data packets that are being transmitted from the Receiver to the Sender, thus eliminating the need for an extra feedback packet.

The rate estimation and control techniques described herein operate on the information associated with the most recently received individual packets. A rate estimation and control algorithm employed by the Receiver may operate over a time-window of width T. The individual packets are sampled over the time window T, in the sense that the receiver collects the information associated with the received packets within the last T seconds of time. Operating over a set of samples, instead of on a per-packet basis, provides results that are statistically more reliable, as the network and the sending source may exhibit random variations over the individual packet samples.

Figure 3:
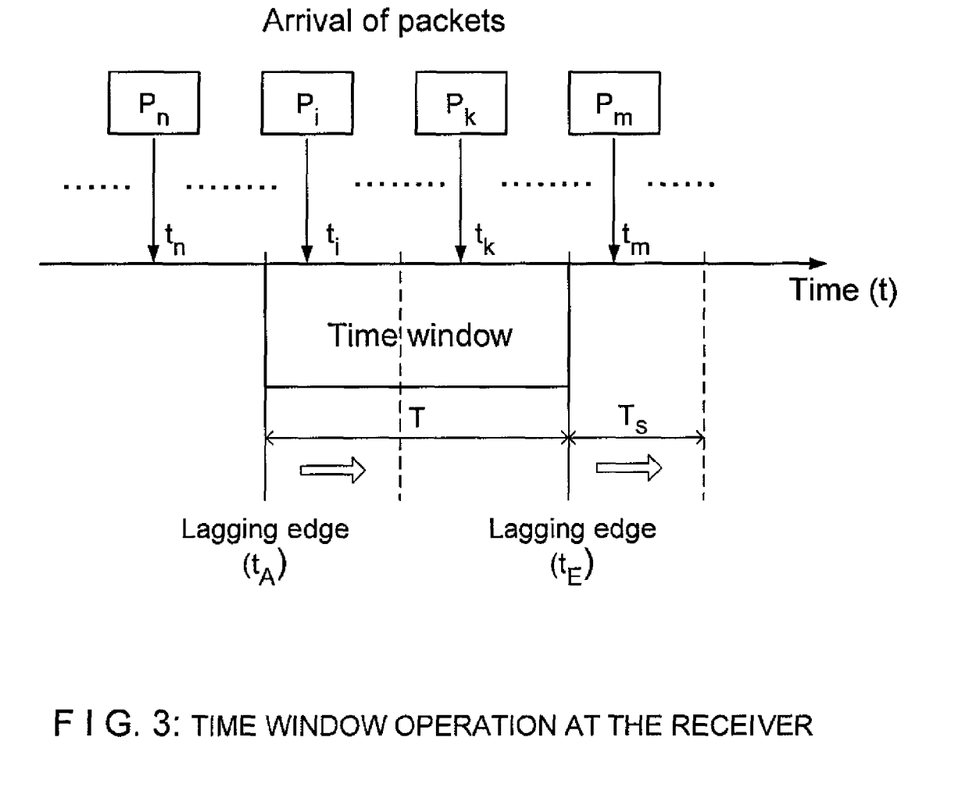
FIG. 3 is a schematic illustration of the time window operation at the receiver, in accordance with the principles of the present invention.

FIG. 3 shows an exemplary time-window operation of a rate estimation and control algorithm at the Receiver. The time window T is described by its leading and lagging edges, $t_E$ and $t_A$, respectively, where $t_A = t_E - T$. At the instant shown in FIG. 3, the time window T includes packets $P_i$ and $P_k$ as their arrival times occur in the interval $[t_A, t_E]$. After the rate estimation and control algorithm is applied on this time window, the Receiver updates the time window's content by sliding it forward in time by a slide forward interval $T_S$: the Receiver collects packet data for every new arrival in the period $[t_E, t_E+T_S]$. For example, the Receiver collects packet data for packet $P_m$, which arrived during this period, as shown in FIG. 3. At the same time, the Receiver discards the information associated with packets that were received in the interval $[t_A, t_A+T_S]$. For example, the arrival data for packet $P_j$, which arrived during this interval as shown in FIG. 3, is discarded by the Receiver under this procedure. Then, at time instance $t_E+T_S$, the Receiver updates the lagging and leading edge of the window as $t_A=t_A+T_S$ and $t_E=t_E+T_S$. Another application of the rate control algorithm to the updated time window is initiated at this point. The procedure of updating the time window's content by sliding and application of the rate control algorithm is repeated over and over.

Further, Receiver 120 maintains a delay jitter array $D=\{D_1, D_2, \ldots, D_N\}$ associated with the time window T. The elements of D represent the difference between the inter-arrival time and the inter-packet time-stamp difference between consecutive packets in the window. For example, if the window consists of packets $\{P_{i+1}, \ldots, P_{i+N}\}$, then the elements of D are computed as: $D_j=(t_{i+j}-t_{i+j-1})-(TS_{i+j}-TS_{i+j-1})$, for $j=1, \ldots, N$. It is noted that the first element of D is computed relative to the last received packet ($P_i$) outside the time window.

Receiver 120 also maintains an array $R=\{R_1, R_2, \ldots, R_N\}$ of arrival data rates $R_i$ for every packet $P_i$ within the time window. BRE 190 computes the arrival bit rate (e.g., in bits per second) of the incoming packets as they arrive. The arrival rate $R_i$ associated with the instance when packet $P_i$ is received is computed as the average data rate of packets that have arrived at the Receiver within a given time period $T_R$ (e.g., the last one second). In equation form, $R_i=\Sigma_j B_j/T_R$, where the sum runs over all packet indices $j \leq i$ such that $t_i-t_j \leq T_R$ and $B_j$ denotes the size of packet $P_j$ in bits.

When considering the application of a rate estimation and control algorithm, it is important to be able to distinguish between congestion and voluntary source bit rate changes performed at the Sender. Indeed, it may happen that the Sender voluntarily changes its transmission rate and the network has sufficient available bit rate to accommodate it. However, since such a transmission rate change event may cause changes in the parameters computed at the Receiver (e.g., delay jitter), such event may be falsely classified by BRE 190 as induced congestion. In response, the Receiver could then signal the Sender to reduce its transmission rate, when in fact there is no need to do that.

In implementations of the present invention, Receiver 120 performs a preprocessing step before it applies its rate control algorithm in order to avoid misidentification of a voluntary source rate change as congestion, which misidentification could lead to an inappropriate rate control response. In the preprocessing step, Receiver 120 may, for example, compute the standard deviation for the delay jitter array D and compare its value to a predetermined threshold. Receiver 120 may recognize an event as congestion only when the threshold is exceeded and only then apply the rate control algorithm.

In a first embodiment of the Bit Rate Estimator (e.g., BRE 190) according to the present invention, the available bit rate is estimated through the delay jitter. Consider the example of the effect of congestion at a network router 400 shown in FIG. 4. In this example, incoming packets $P_i$ arrive at the router's queue 410 at the rate of $R_A$ bits per second, while the router forwards outgoing packets $P_j$ on its outgoing link (and out of the queue) at a rate of $R_F$ bits per second. It is noted that $R_A$ and $R_F$ are average data rates computed over a time interval $T_{AF}$ (which, for example, may be of the order of one second). Therefore, in this example, any queuing delay at router 400 occurring on shorter time scales and due to instantaneous rate variations on the links can be essentially ignored. As long as $R_A < R_F$, the incoming packets do not experience any queuing delay at the router. Further, let $t_0$ denote the time at which the incoming rate $R_A$ exceeds $R_F$. The waiting delay for the first packet arriving at the router 400 after the time $t_0+T_{AF}$ seconds will be equal to $\{(R_A-R_F)/R_F\} \times T_{AF}$ seconds. If the difference $(R_A-R_F)$ is equal to 1% of $R_F$, then this ratio will be equal to 10 milliseconds per 1 second. In other words, for every second of data that the router forwards from its queue after $t_0$, there will be an additional waiting delay of 10 milliseconds in the queue for the respective packets arriving at the router precisely at those time instances.

Figure 4:
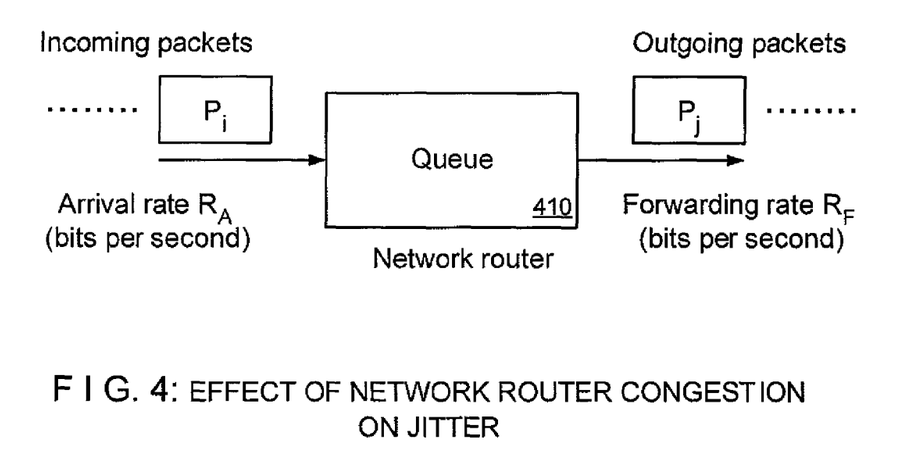
FIG. 4 is a schematic illustration of an exemplary network router for the analysis of the effects of router congestion to packet jitter, in accordance with the principles of the present invention.

The queuing delay experienced in this fashion will be translated into a delay jitter for the arriving packets at the receiver. The delay jitter and its rate of change (over time) can be computed or measured. Using a nominal value for the waiting delay for the first packet $(R_A-R_F)/R_F$ (e.g., the above value of 10 milliseconds/1 second), the relative difference between the transmission rate of the sender and the available bit rate in the network during congestion can be determined from the delay jitter estimates or measurements. For example, 50 milliseconds of delay jitter measured over the span of one second corresponds to a relative transmission bit rate vs. network bit rate difference of 5%. This relative difference, which is the available bit rate estimate, can be signaled back to the sender so that it can adjust its transmission rate accordingly to avoid congestion.

It is noted that the foregoing analysis of BRE 190's estimate of the available bit rate through the delay jitter does not consider packet loss that may potentially occur along the network path between the sender and the receiver. Therefore, BRE 190 is further configured to compute a conservative estimate of the optimal transmission rate for the sender, which configuration in turn enables reduction or elimination of any packet loss caused by congestion during subsequent time periods.

Figure 5:
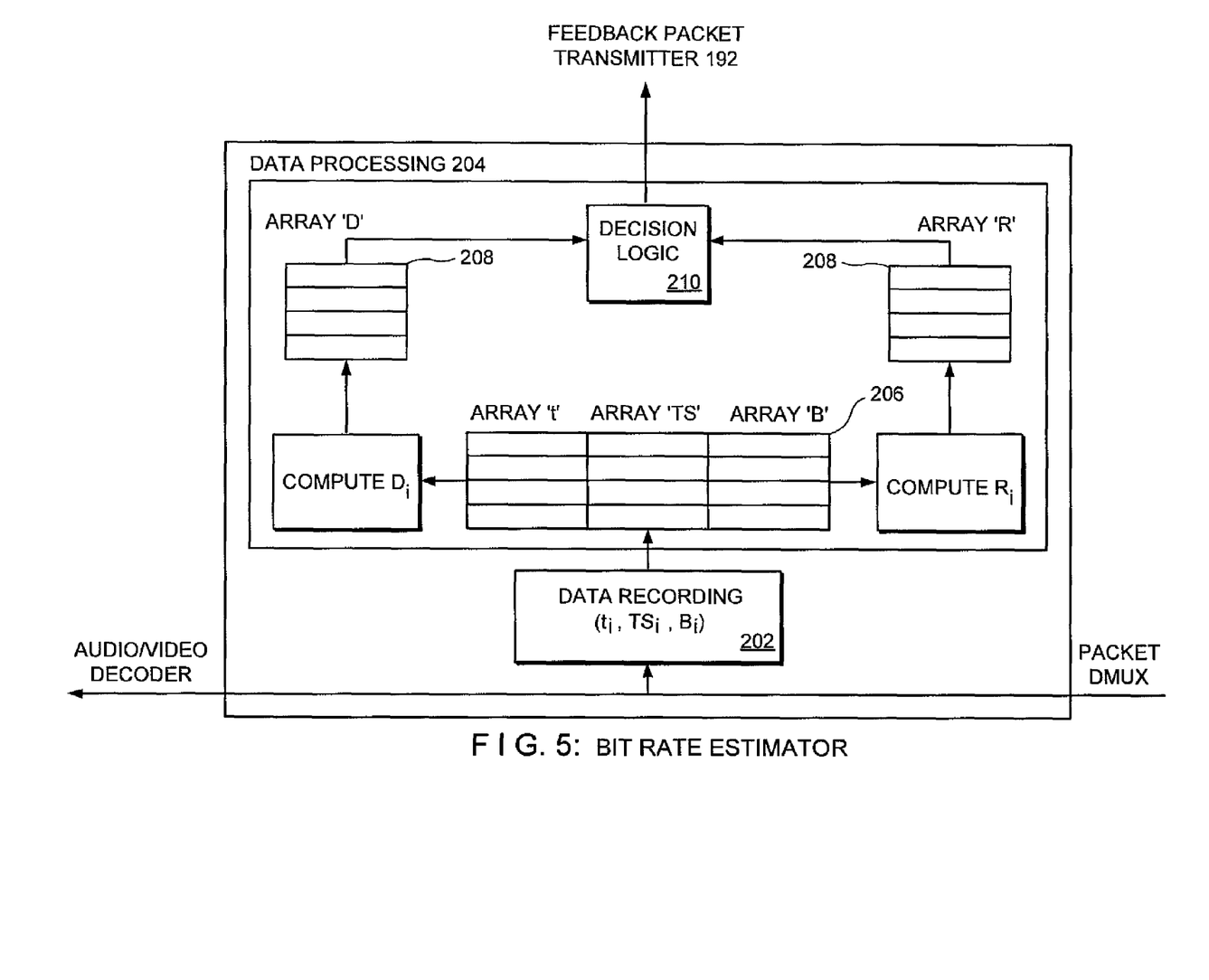
FIG. 5 is a schematic illustration of the architecture of the receiving system's Bit Rate Estimator (BRE), in accordance with the principles of the present invention.

BRE 190 obtains estimates of the delay jitter from the array D of collected jitter samples within the time window. FIG. 5 shows further details of the exemplary architecture and processes of the BRE shown in FIG. 4. Data Recording Unit 202 of the BRE collects $t_i$, $TS_i$, and $B_i$ values for each arriving packet as described above. These values are made available to the Data Processing Unit 204 where they are stored in appropriate memory areas 206 (arrays). Data Processing Unit 204 then calculates $D_i$ and $R_i$ values for the current time window, which are stored in the ARRAY 'D' and 'R' memory areas 208 for use by the Decision Logic Unit 210. All the arrays 206 and 208 can be operated as FIFO queues (first-in, first-out), so that only the new value for each arriving packet has to be calculated. Since the total number of packets contained within a time window is not known in advance and can vary over time, the arrays have to be dimensioned appropriately to be able to contain the maximum number of packets that may be present within a time window. Software-based implementation of Data Processing Unit 204 may dynamically reallocate buffer space if the arrays' capacity is exceeded.

With continued reference to FIG. 5, Decision Logic Unit 210 is configured to operate on the D array 208 in order to obtain a jitter estimate and to determine the next estimate of the available bit rate. A given percentile value X for a set is the value that is larger than X percent of the values in the set. For example, an 80 percentile value for D represents the sample in D that is larger than 80 percent of all samples in D. Experimental analysis has established that high (80-90) percentile values for D provide a much higher correlation with the induced network variations than the conventional choice of using the average value of the samples in D.

Figure 6:
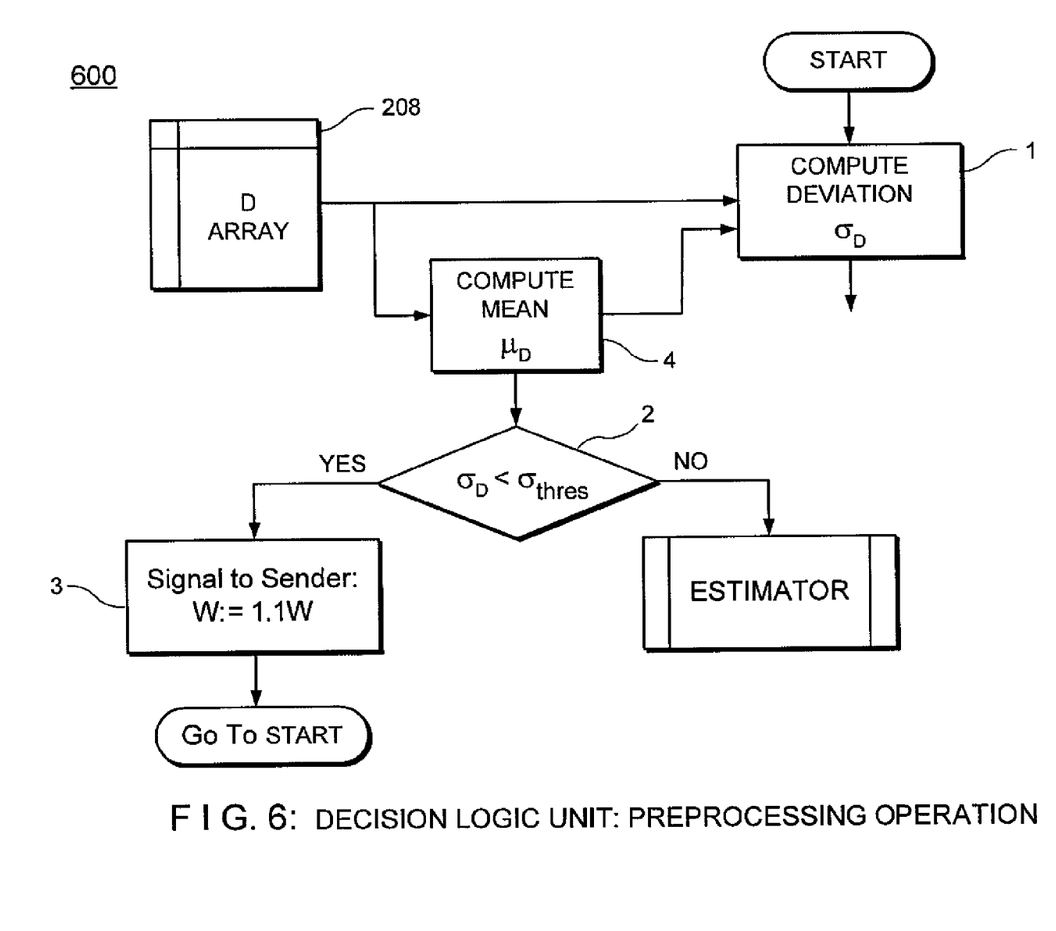
FIG. 6 is a schematic illustration of the preprocessing steps of the Decision Logic unit of the Data Processing unit of the BRE, in accordance with the principles of the present invention.
Figure 7:
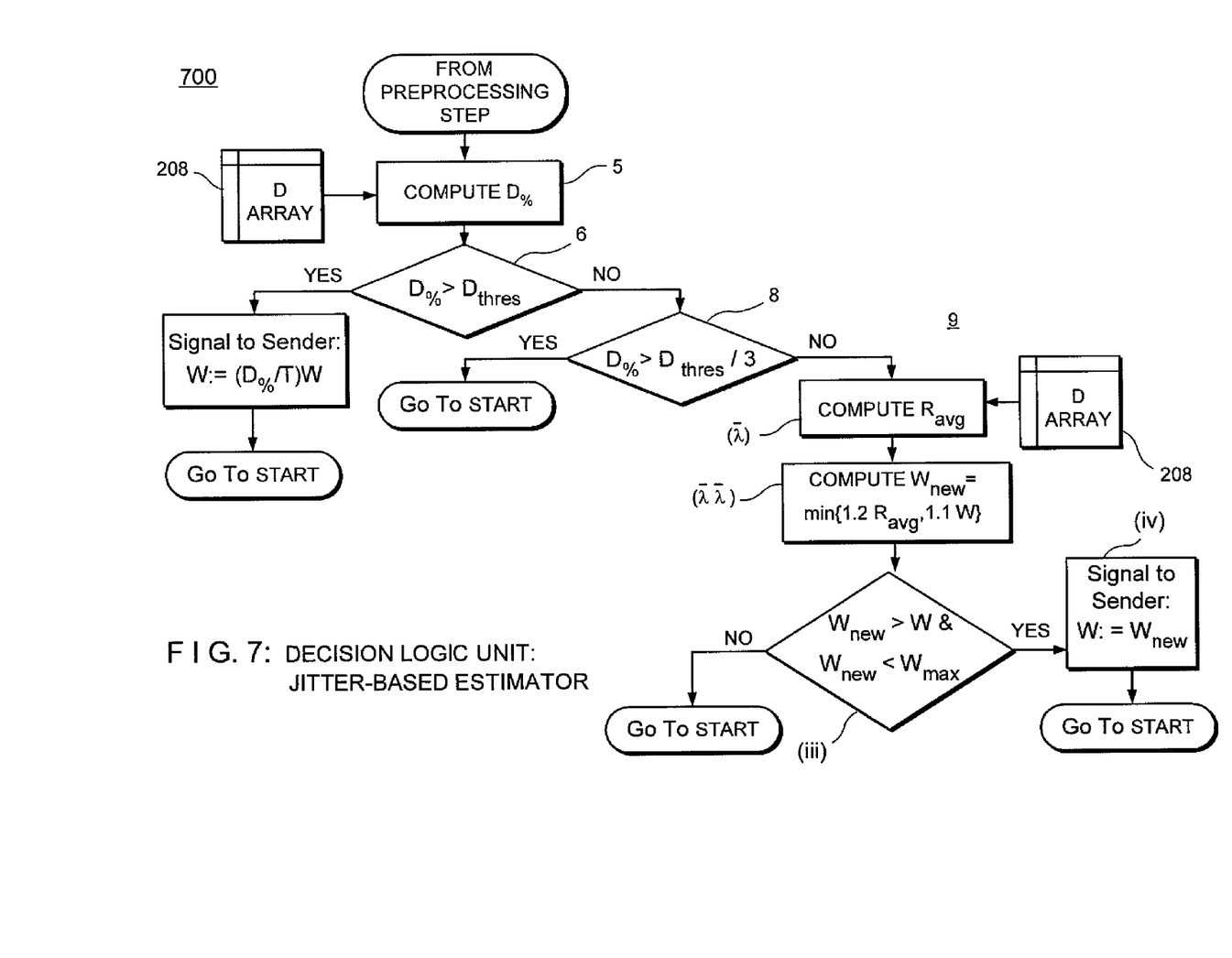
FIG. 7 is a schematic illustration of the operation of the Estimator of the Decision Logic unit of the Data Processing unit of the BRE when jitter-based estimates are used, in accordance with the principles of the present invention.

The detailed operation of Decision Logic Unit 210 is described further herein with references to FIGS. 6 and 7, which show exemplary steps in preprocessing and rate estimation processes 600 and 700, respectively. The parameter W in the figures denotes the current estimate at the Receiver of the available bit rate of the network connection.

With reference to FIG. 6, steps 1-4 in preprocessing process 600 for determining whether a transmission event is a true congestion event and responding accordingly are as follows:

(1) Compute the standard deviation $\sigma_D$ for the array of delay jitter samples $D=\{D_1, \ldots, D_N\}$:

$$\sigma_D = \sqrt{\frac{1}{N}\sum_i (D_i - \mu_D)^2}$$

where $$\mu_D = \frac{1}{N}\sum_i D_i$$

is the sample mean;

(2) Next, compare the computed standard deviation to a threshold value $\sigma_{thres}$.

(3) If $\sigma_D < \sigma_{thres}$, signal the Sender to increase its transmission rate.

(4) Or, else if $\sigma_D \geq \sigma_{thres}$ perform rate "Estimator" processing steps as shown, for example, in FIG. 7.

Step 3 action is based on the premise that there is no congestion in the network and therefore the Sender can prospectively increase its transmission bit rate. In response to the step 3 signal, the Sender may increase its transmission rate by any convenient percentage value. In a preferred embodiment, the percentage value of 10% (i.e., W:=1.1 W) is used. Further, the preferred values of $\sigma_{thres}$ T and $T_S$ may be $\sqrt{240}$, 500 milliseconds and 250 milliseconds, respectively. These values have been found to be effective over a broad range of conditions, as verified through experimental analysis. It will be understood that other preferred values may be used to account for specific network operating conditions and environments. Further, to minimize the computational requirements in an implementation of process 600, variances can be used instead of deviations (i.e., $\sigma_D^2$ and $\sigma_{thres}^2$ instead of $\sigma_D$ and $\sigma_{thres}$) with no change in the algorithm, to avoid the computation of square roots.

Step 4 initiates application of rate estimation algorithms and processes upon confirmation of congestion (i.e., $\sigma_D \geq \sigma_{thres}$). FIG. 7 shows exemplary steps 5-9 in a jitter based rate estimation process 700. The steps are as follows:

(5) Compute the PrctVal percentile for D (where PrctVal is between 80 and 90 in a preferred embodiment) and denote it by $D_{\%}$. $D_{\%}$ may be computed by:

Sorting the samples in D in increasing order. Let $D^S$ denote the sorted array.

Finding the index i in DS such that $i \approx (N*PrctVal)/100$.

Setting D %=DSi.

(6) Compare $D_{\%}$ and $D_{thres}$, where $D_{thres}$ is a design parameter selected to avoid frequent fluctuations or changes in the desired transmission rates.

(7) If $D_{\%} > D_{thres}$, send feedback to the Sender to reduce the transmission rate by the ratio $D_{\%}/T$, where T is the time duration of the window of samples comprising D (i.e., set $W := (D_{\%}/T)W$).

(8) Compare $D_{\%}$ and $D_{thres}/3$ to determine whether an increase in transmission rate should be signaled to the Sender as the cumulative delay has not increased significantly.

(9) If $D_{\%} < D_{thres}/3$, determine the increase in transmission rate that should be signaled to the sender as the cumulative delay has not increased significantly. This is accomplished by the following steps:

(i) Compute $R_{avg}$ ($R_{avg} = \Sigma_i R_i/N$), which is the current estimate of the arrival rate at the receiver.

(ii) Compute a new candidate value of W using, for example, the expression $W_{new} = \min\{1.2 R_{avg}, 1.1 W\}$. The particular choice of the coefficients (e.g., 1.2 and 1.1) in the expression may be made to ensure a gradual increase of the transmission bit rate.

(iii) Compare $W_{new}$ with current rate W, and with the maximum allowed rate on the link $W_{max}$.

(iv) If $W_{new}$ is less than $W_{max}$ and $W_{new} > W$, signal to the sender $W_{new}$ as the new value of W. Conversely, if $W_{new}$ is greater than $W_{max}$ or less than the present transmission rate W, no action is taken.

At step (8), if $D_{\%} > D_{thres}/3$, then the change in delay is not significant enough to trigger signaling of a modification in the Sender transmission rate. In a preferred embodiment of process 700, the delay threshold $D_{thres}$ may be set to 12 milliseconds, but other values may be used to account for specific network operating conditions and environments.

In an alternative embodiment of the Bit Rate Estimator (e.g., BRE 190) according to the present invention, the available bit rate is estimated using the arrival data rate values, as recorded by the receiver, rather than jitter. In this alternative embodiment, the BRE 190 uses a linear interpolation value of the rate array R along the time axis to extrapolate to the future value of the arrival data rate at the end of the next sliding interval $T_S$ for the time window of received packet data. This future value is compared with the current estimate of available bit rate as well as the bit rate computed at the end of the current time window in order to arrive at an estimate of the new value of the available bit rate.

Figure 8:
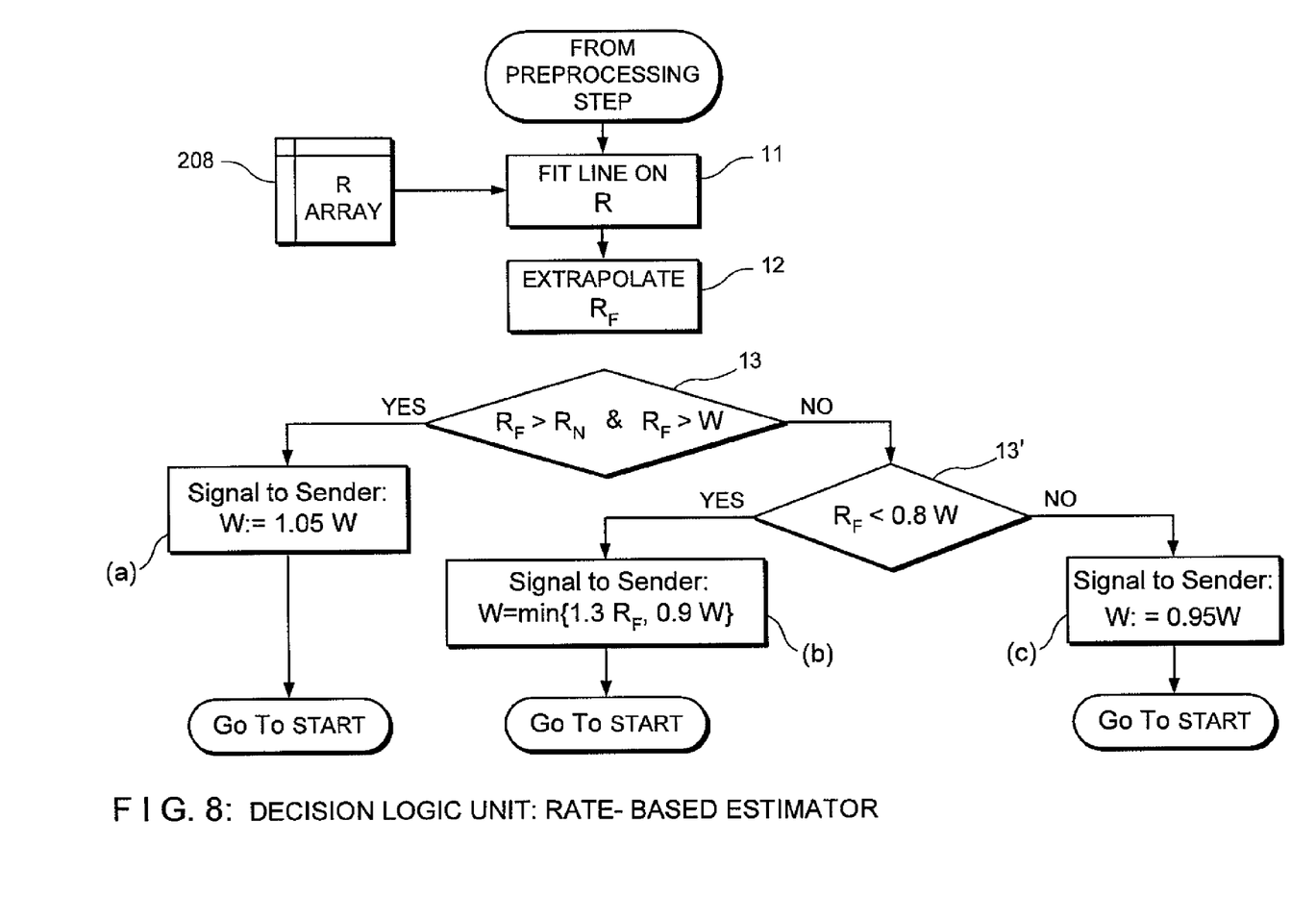
FIG. 8 is a schematic illustration of the operation of the Estimator of the Decision Logic unit of the Data Processing unit of the BRE when rate-based estimates are used, in accordance with the principles of the present invention.

The overall architecture of BRE 190 using rate-based estimation is similar to the architecture of jitter-based BRE 190 shown in FIG. 5. The preprocessing steps in the two types of BRE 190 also may be identical (e.g., as shown in FIG. 6). Only the rate estimation operation in the Decision Logic unit is different. FIG. 8 shows exemplary steps 11-13 in a rate-based estimation process 800 for BRE 190. Steps 11-13 are as follows:

(11) Interpolate R with a linear function of time using least-squares fitting.

(12) Compute the future value of the arrival data rate $R_F$ at the end of the next interval $T_S$. For example, $R_F$ may be computed as $a_0 + a_1 (t_N + T_S - t_1)$, where $a_0$ and $a_1$ are the coefficients of the linear fit at step 11, and where $t_1$ and $t_N$ respectively represent the time instances of the first and last rate samples used in the linear fit.

(13) Perform checks on the value of $R_F$ relative to the values of $R_N$ and the current estimate of the available bit rate W, and accordingly compute the new bit rate estimate. Exemplary checks at step 13 verify if ($R_F > R_N$ and $R_F > W$) and if $R_F < 0.8$ W. The value of W may be set according to the results of the checks. For example, (a) If ($R_F > R_N$ and $R_F > W$) set W:=1.05 W (b) or, Else-If $R_F < 0.8$ W set W=min $\{1.3 R_F, 0.9 W\}$ (c) Else set W=0.95 W The motivation behind the design of $R_F$ checks and the new W values can be understood with consideration of the following example. Assume that a congestion event is observed. In such case, as the system recovers from the congestion event (the R estimates are increasing as indicated by positive results for $R_F > R_N$ and $R_F > W$), it is desirable to signal an increase in the available bit rate for the next cycle of the algorithm. This is the reason for the modest (5%) step-up in W following the check in step (a). Conversely, the step (b) check determines if the bit rate will drop significantly in the future (i.e. $R_F < 0.8$ W is positive) and accordingly lowers the available bit rate for the next cycle of the algorithm gradually by computing the new bit rate as W=min $\{1.3 R_F, 0.9 W\}$ in an attempt to avoid a potentially substantial reduction in the sending rate. Finally, if these two check conditions are not met in step (c), taking a conservative approach, the current estimate of the available bit rate is reduced by 5% in order to reduce the potential for congestion in the future.

In both the rate-based and jitter-based BRE embodiments described above, the new estimate of the available bit rate W that is to be communicated to the Sender is provided to Feedback Packet Transmitter 192 (FIG. 1) as indicated in FIG. 5. Feedback Packet Transmitter 192 simply transmits the value of the new estimate back to the Sender using an appropriate transport protocol. In a preferred embodiment of the invention, the feedback packet transmitted from the Receiver to the Sender is a signaling packet containing the value of W represented as a 32-bit number. Alternative representations, such as a 16-bit integer indicating multiples of a set base bit rate (e.g., 10 Kbps) may also be used. Alternative forms of packetization and representation are also possible consistent with the invention, as will be obvious to people skilled in the art.

In practice, network conditions such as packet loss, packet delay, and available bit rate vary over time. To account for these variations, the values of the design parameters (e.g., $\sigma_{thres}$ and $D_{thres}$) of the rate control algorithms described herein may be dynamically adapted. For example, assuming an RTP-based environment, based on information provided in RTCP reports exchanged between the sender and the receiver, these thresholds (i.e., $\sigma_{thres}$ and $D_{thres}$) in particular can be modulated so that they account for the time-varying nature of the network state. Such modulation is expected to improve the performance of the rate estimation and control methods described herein relative to the cases when the values for these parameters are fixed.

It will be understood that in accordance with the present invention, the rate estimation and control techniques described herein may be implemented using any suitable combination of hardware and software. The software (i.e., instructions) for implementing and operating the aforementioned rate estimation and control techniques can be provided on computer-readable media, which can include without limitation, firmware, memory, storage devices, microcontrollers, microprocessors, integrated circuits, ASICs, on-line downloadable media, and other available media.

We claim:

1. A transmission bit rate control mechanism for a packet-based communication system, wherein the communication system comprises:
   a sender that transmits packet data at a certain transmission bit rate that can vary over time;
   a receiver that receives transmitted packet data from the sender; and
   a packet-based communication network that provides a communication path between the sender and the receiver;
   and wherein the transmission bit rate mechanism comprises:
   a receiver recording mechanism which receives transmission time information included in the transmitted packets by the sender, and computes and records statistical parameters of the received packets and communicates the computed and recorded statistical parameters to the sender over the communication network; and
   a sender processing mechanism which selectively computes a new transmission bit rate using the received recorded statistical parameters;
   wherein the receiver recording mechanism is configured to record estimates of packet inter-arrival jitter;
   wherein the sender processing mechanism is configured to selectively compute a new transmission bit rate by:
   computing an estimate of the packet inter-arrival jitter over a given time period;
   comparing the packet inter-arrival jitter estimate with a threshold; and
   if the threshold is exceeded,
      setting the transmission bit rate to a fraction of the current transmission bit rate, the fraction being equal to the ratio of the jitter estimate to the time period.

2. The transmission bit rate mechanism of claim 1, wherein the sender processing mechanism is further configured to selectively compute a new transmission bit rate, if the threshold is not exceeded, by:
   comparing the jitter estimate with a fraction of the threshold;
   if the fraction of the threshold is not exceeded, computing an estimate of the average bit rate of received packets using received recorded statistical parameters; and
      computing a potential new value for the transmission bit rate as the minimum of two quantities that are equal to, or slightly higher than, the computed estimate of the average bit rate of received packets and the current transmission bit rate, respectively; and
   if the potential new value exceeds the current transmission bit rate,
      communicating to the sender that its transmission bit rate should be set to the potential new value.

3. A method for transmission bit rate control for a packet-based communication system, wherein the communication system comprises:
   a sender that transmits packet data at a certain transmission bit rate that can vary over time;
   a receiver that receives transmitted packet data from the sender; and
   a packet-based communication network that provides a communication path between the sender and the receiver;
   the method comprising:
   at the receiver,
      receiving transmission time information included in the transmitted packets by the sender, and computing and recording statistical parameters of the received packets, and communicating the computed and recorded statistical parameters to the sender over the communication network; and
   at the sender,
      selectively computing a new transmission bit rate using the received recorded statistical parameters;
   wherein recording statistical parameters of the received packets comprises recording estimates of packet inter-arrival jitter, and
   wherein selectively computing a new transmission bit rate using the recorded statistical parameters comprises:
      computing an estimate of the packet inter-arrival jitter over a given time period;
      comparing the packet inter-arrival jitter estimate with a threshold; and
      if the threshold is exceeded, setting the transmission bit rate to a fraction of the current transmission bit rate, the fraction being equal to the ratio of the jitter estimate to the time period.

4. The method of claim 3, wherein selectively computing a new transmission bit rate using the received recorded statistical parameters further comprises:
   if the threshold is not exceeded,
      comparing the jitter estimate with a fraction of the threshold;
      if the fraction of the threshold is not exceeded,
      computing an estimate of the average bit rate of received packets using recorded statistical parameters; and
      computing a potential new value for the transmission bit rate as the minimum of two quantities that are equal to, or slightly higher than, to the computed estimate of the average bit rate of received packets and the current transmission bit rate, respectively; and
      if the potential new value exceeds the current transmission bit rate, communicating to the sender that its transmission bit rate should be set to the potential new value.

5. A non-transitory computer readable medium for transmission bit rate control for a packet-based communication system, wherein the communication system comprises:
   a sender that transmits packet data at a certain transmission bit rate that can vary over time;
   a receiver that receives transmitted packet data from the sender; and
   a packet-based communication network that provides a communication path between the sender and the receiver;
   the computer-readable medium having a set of instructions operable to direct a processing system to:
   at the receiver,
      receiving transmission time information included in the transmitted packets by the sender, and computing and recording statistical parameters of the received packets and communicating the computed and recorded statistical parameters to the sender over the communication network; and
   at the sender,
      selectively computing a new transmission bit rate using the received recorded statistical parameters;
   wherein recording statistical parameters of the received packets comprises recording estimates of packet inter-arrival jitter, wherein recorded and computed statistical parameters include estimates of an arrival bit rate of the received packets, and wherein selectively computing a new transmission bit rate using the recorded statistical parameters comprises:

computing an estimate of the packet inter-arrival jitter over a given time period;

comparing the packet inter-arrival jitter estimate with a threshold; and if the threshold is exceeded, setting the transmission bit rate to a fraction of the current transmission bit rate, the fraction being equal to the ratio of the jitter estimate to the time period.

6. The computer readable medium of claim 5, wherein selectively computing a new transmission bit rate using the recorded statistical parameters further comprises:

if the threshold is not exceeded, comparing the jitter estimate with a fraction of the threshold;

if the fraction of the threshold is exceeded, computing an estimate of the average bit rate of received packets using recorded statistical parameters; and computing a potential new value for the transmission bit rate as the minimum of two quantities that are equal to, or slightly higher than the computed estimate of the average bit rate of received packets and the current transmission bit rate, respectively; and if the potential new value exceeds the current transmission bit rate, setting the transmission bit rate to the potential new value.

* * * * *